US012716433B2

(12) United States Patent
Weiß et al.

(10) Patent No.: US 12,716,433 B2
(45) Date of Patent: Aug. 25, 2026

(54) METHOD FOR PROVIDING AT LEAST ONE ITEM OF INFORMATION RELATING TO A HYDRAULIC SYSTEM

(71) Applicant: KSB SE & CO. KGaA, Frankenthal (DE)

(72) Inventors: Benjamin Weiß, Frankenthal (DE); Stefan Unland, Frankfurt am Main (DE); Maximilian Leppla, Frankenthal (DE); Dmitry Orlov, Frankfurt am Main (DE)

(73) Assignee: KSB SE & Co. KGaA, Frankenthal (DE)

( * ) Notice: Subject to any disclaimer, the term of this patent is extended or adjusted under 35 U.S.C. 154(b) by 257 days.

(21) Appl. No.: 18/261,468

(22) PCT Filed: Jan. 12, 2022

(86) PCT No.: PCT/EP2022/050548
§ 371 (c)(1),
(2) Date: Jul. 13, 2023

(87) PCT Pub. No.: WO2022/152752
PCT Pub. Date: Jul. 21, 2022

(65) Prior Publication Data

US 2024/0102497 A1 Mar. 28, 2024

(30) Foreign Application Priority Data

Jan. 13, 2021 (DE) ......................... 102021100566.3

(51) Int. Cl.
*F15B 19/00* (2006.01)

(52) U.S. Cl.
CPC .......... *F15B 19/005* (2013.01); *F15B 19/007* (2013.01); *F15B 2211/857* (2013.01)

(58) Field of Classification Search
CPC . F15B 19/005; F15B 19/007; F15B 2211/857
See application file for complete search history.

(56) References Cited

U.S. PATENT DOCUMENTS 7,392,165 B2 6/2008 Nixon et al.
10,521,550 B2 12/2019 Drumm et al.
(Continued)

FOREIGN PATENT DOCUMENTS

CN 111911483 11/2020
DE 102018219365 5/2020
(Continued)

OTHER PUBLICATIONS

PERERA et a. (Engineering Applications of Artificial Intelligence 121 (2023) 105988) (Year: 2023).*
(Continued)

*Primary Examiner* — Nathaniel J Kolb
(74) *Attorney, Agent, or Firm* — Thorpe North & Western, LLP

(57) ABSTRACT

The invention relates to a method for providing at least one piece of information about a hydraulic apparatus (1), wherein the following stages are performed:

Figure 1:
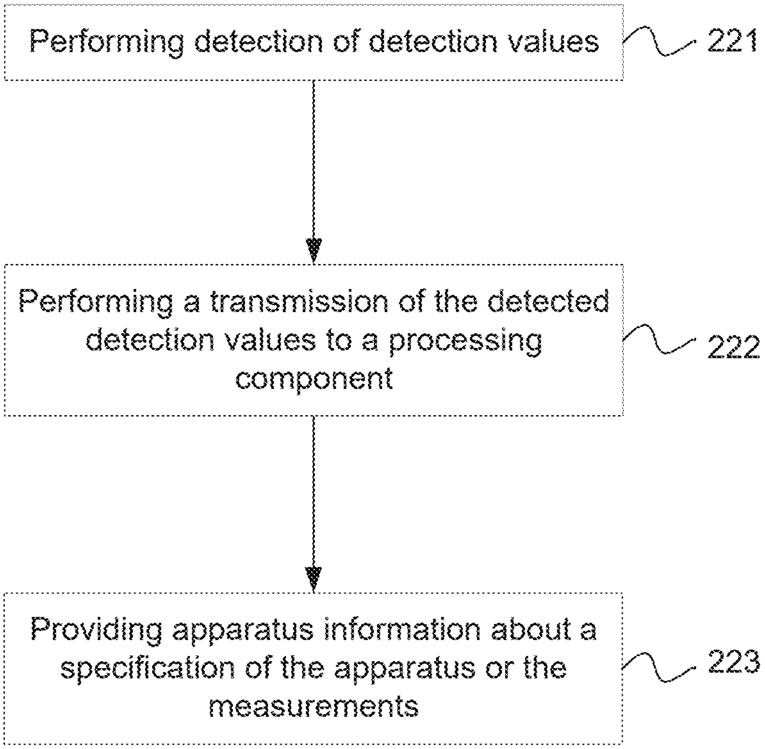

Performing a detection (201) of detection values (210) at the apparatus (1), wherein the detection values (210) are specific for measurements at different measuring points and at different apparatus components (120) of the apparatus (1), Performing a transmission (202) of the detected detection values (210) to a processing component (300), Providing an apparatus information (211) about a specification of the apparatus (1) and/or the measurements, wherein providing the apparatus information (211) is performed at the processing component (300) to pro- (Continued)

vide the transmitted detection values (210) with the apparatus information (211).

18 Claims, 2 Drawing Sheets

(56) References Cited

U.S. PATENT DOCUMENTS

| | | | | |
|---|---|---|---|---|
| 11,500,349 | B2 * | 11/2022 | Altendorf | G06N 20/00 |
| 2016/0300001 | A1 * | 10/2016 | Drumm | G05B 17/02 |
| 2017/0138018 | A1 * | 5/2017 | Beschorner | E02F 9/2296 |
| 2020/0012249 | A1 * | 1/2020 | Altendorf | H04W 12/06 |
| 2020/0025193 | A1 * | 1/2020 | Remmelmann | F15B 21/082 |

FOREIGN PATENT DOCUMENTS

| | | |
|---|---|---|
| DE | 102018133428 | 6/2020 |
| DE | 102019215016 | 7/2020 |
| DE | 102020103019 | 8/2020 |
| EP | 1669613 | 5/2008 |
| EP | 2228545 | 12/2015 |
| EP | 3597941 | 1/2020 |
| EP | 3715982 | 9/2020 |
| WO | 2008111907 | 9/2008 |
| WO | 2019235610 | 12/2019 |

OTHER PUBLICATIONS

International Search Report for PCT/EP2022/050548 mailed Apr. 12, 2022.

* cited by examiner

METHOD FOR PROVIDING AT LEAST ONE ITEM OF INFORMATION RELATING TO A HYDRAULIC SYSTEM

The present invention relates to a method for providing at least one piece of information about a hydraulic apparatus. Further, the invention relates to a system, a computer-implemented data structure, and a computer program for this purpose.

It is known from the prior art that detection values are detected in a hydraulic apparatus in order to be able to monitor and/or evaluate at least one condition of the hydraulic apparatus and its components. However, the available detection values are often insufficient to enable a reliable analysis of the apparatus.

In control systems of industrial or building services apparatus, the focus is on the process result and not on the hydraulic interaction of hydraulically active components, such as pumps and control valves. Therefore, their operating points are often completely unknown. It is therefore sometimes a problem with conventional solutions that the operating modes of such components of the apparatus cannot be fully determined or represented and evaluated in conjunction with each other. Even when retrofitted diagnostic equipment is used, it often feeds the measurement data into separate systems, which also makes it difficult to evaluate the apparatus. This means that with existing technical solutions, it is often not possible to perform a reliable cross-component system analysis with regard to stress or energy-saving potential or control performance, and interrelationships and interactions between individual components also often remain unrecognized.

It is therefore an object of the present invention to at least partially eliminate the disadvantages described above. In particular, it is an object of the present invention to enable an improved evaluation of an apparatus.

Further features and details of the invention result from the respective dependent claims, the description and the drawings. In this context, features and details described in connection with the method according to the invention naturally also apply in connection with the system according to the invention, the computer-implemented data structure according to the invention and the computer program according to the invention, and vice versa in each case, so that reference is or can always be made mutually with respect to the disclosure concerning the individual aspects of the invention.

The object is solved in particular by a method for providing at least one piece of information about a hydraulic apparatus. The method can be at least partially computer-implemented, and/or at least partially provided by at least one electronic circuit arrangement and/or sensors and/or at least one microcontroller and/or the like.

In the method according to the invention, it is envisaged that the following steps/stages are carried out, preferably one after the other in the order indicated or in any order, and the steps/stages can also be carried out repeatedly:

- Performing a detection of detection values at the apparatus, wherein the detection values can be specific for measurements at different measuring points and/or at different apparatus components of the apparatus, in particular resulting therefrom,
- Performing a transmission, in particular data transmission, of the detected detection values to a processing component, in particular an electronic and/or centralized and/or decentralized processing component,
- Providing, in particular digital, apparatus information about a specification of the apparatus and/or the measurements, the provision of the apparatus information preferably taking place at the processing component, in particular in addition to the transmission of the detection values, in order to provide the transmitted detection values with the apparatus information.

The detection can be done by several measurements at different apparatus components, and thus cross-componently. In this way, a cross-component detection can be provided at the apparatus together with the apparatus information specific to the detection. This has the advantage that a visualization and/or evaluation of the hydraulic interaction of the apparatus components, such as at least one pump, in particular centrifugal pump, and/or at least one control valve, is possible by the processing component on the basis of the provided detection values and apparatus information across components. This evaluation can be based on an analysis of the previously detected, in particular read-out, relevant operating and diagnostic data from the hydraulic apparatus. Accordingly, the detection values can also comprise the operating and diagnostic data. If necessary, the detection can also be carried out at least in part by connecting live data, for example by means of at least one router and/or by connecting third-party systems. Likewise, the detection may be performed at least in part by reading out historical data. The detection values can be stored in a memory component before and/or after transmission and processed for analysis by the processing component.

The apparatus information can be implemented as static information, i.e. it can comprise static data which is not changed during the entire performance of the process. The detection values, on the other hand, can be configured as dynamic information, i.e. comprising dynamic field data that is measured again each time the method steps/stages are performed, i.e. each iteration.

The method may be provided in the form of an operational assistance method, and may be carried out, for example, by a system according to the invention in the form of an operational assistance system. The apparatus is, for example, an industrial or building service hydraulic apparatus. Also, the apparatus may be a general apparatus, in which material flows are generated and controlled.

The apparatus can have apparatus components such as at least one pump, in particular centrifugal pump, and/or at least one control valve. The apparatus components may further be hydraulically active and/or hydraulically interconnected. However, the apparatus components cannot be individually in focus and are sometimes even unknown from the perspective of measurements (if no measurements are performed there). Thus, it is conventionally not directly possible to completely determine their modes of operation by the measurements and/or to represent and/or evaluate them in connection with each other. Thus, with conventional technical solutions, often no reliable cross-component system analysis is possible with regard to a stress or energy saving potential or control performance, and also interrelationships and interactions between individual components remain unrecognized.

The method according to the invention can have the advantage that a holistic visualization of the (conventionally separately considered) apparatus components is possible by processing the transmitted detection values on the basis of the apparatus information provided. Furthermore, the processing can enable an analysis of the apparatus components of the apparatus (i.e. in particular all hydraulic individual components as well as the overall system), in particular with regard to load and energy efficiency. This also makes it possible to identify optimization potentials and recommendations for action. If necessary, visualization and/or processing can also be carried out on the basis of a user preset, e.g. by the user presetting optimization targets and/or criteria for optimization such as an energy saving.

It can be provided that at least one optimization potential and/or at least one recommendation for action is output by the method according to the invention, preferably on the basis of the processing, and in particular on the basis of the analysis, and/or by the visualization. For this purpose, a logic can be used in the method according to the invention which enables the derivation of at least one recommendation for action as a function of, for example, the assessment of operating data in comparison with layout and configuration data of the individual apparatus components and/or the identification of causalities across system and operating data and/or of weighty optimization targets with regard to energy and/or load and/or control.

The method according to the invention can thus provide a uniform and comprehensive information platform for the apparatus. Previously unknown modes of operation of the apparatus components can be made individually visible, if necessary, and/or the interaction can be evaluated as a whole. Furthermore, a statement regarding the suitability and configuration of the individual apparatus components can be made via a time period view of the transmitted detection values and/or the results of the processing. Furthermore, on the basis of the results of the processing and/or the centralized and/or decentralized provision of the detection values, potentials for improving the operation of hydraulic circuits of the apparatus can be indicated. The period consideration can take place at least over an apparatus-specific relevant period, e.g. a month and/or at least over a year etc.

Providing the apparatus information can be done, for example, by collecting information about the apparatus in a configuration component. For example, the apparatus information can be at least one information of the topology of the apparatus, in particular one of the following static data: technical configuration data of each apparatus component to be implemented (i.e. an individual component, such as a pump, a control valve or passive piping elements), a structural arrangement of the apparatus components in the piping string relative to each other and/or the respective installation height, a position of the existing measuring points for the measurement, as well as medium data.

It is possible that a result of the processing, in particular via a coupling component, is stored in a memory component and/or published in an analysis software. By publishing it can be understood that the result is transmitted via a network in order to make the result available to a user of the analysis software.

Preferably, the further subsequent step/stage may be provided:

Performing processing of the transmitted detection values by the processing component, the transmitted detection values preferably being compared with one another on the basis of the apparatus information in order preferably to provide a soft sensor system, in particular at least one soft sensor, for at least one further virtual measuring point and/or for a plurality of further virtual measuring points of the apparatus and/or for at least one further apparatus component of the apparatus and/or for at least one further target variable in the apparatus.

In this context, soft sensor system can be understood as the use of at least one soft sensor, whereby the soft sensor can be defined in each case as a dependency simulation of representative measured variables to a target variable.

The provision of a soft sensor system can also be referred to as the provision of at least one soft sensor accordingly. The soft sensor may not be a real sensor, but a dependency simulation of representative measured variables to a target variable. The transmitted detection values can be used at least partially as the representative measured variables. Thus, the target variable is not measured directly, but calculated on the basis of measured variables correlating to it and/or a model of the correlation. This makes it possible to model missing measuring points of the apparatus as soft sensor systems or virtual measuring points and to determine at least one or all operating points of the hydraulically active components (e.g. of at least one pump and at least one control valve). The calculated component operating points can then be evaluated by means of algorithms.

Of further advantage, it can be provided that the detection values are thereby specific for the measurements, that the detection values are at least partially detected in the form of measured values by the measurements at the different measuring points and/or the different apparatus components of the apparatus, and that the detection values are detected at least partially in the form of pre-processed values, in particular diagnostic values, by processing at least one of the measured values and/or further measured values, in particular for diagnosis, at at least one of the apparatus components of the apparatus.

In other words, both detected values from the respective measurements and pre-processed values, in particular diagnostic values, can be acquired as detection values, and the pre-processed values, in particular diagnostic values, can be determined from a processing of the detected measured values and/or further detected values, possibly not acquired by the detection. The detection of the detection values can be performed, for example, by at least one field component. Accordingly, the detection values may be implemented as dynamic field data. The detection can also be understood as a collection of the detection values.

Furthermore, it may be provided that the processing component is configured as a central processing component, such as a server, in order to provide the transmitted detection values with the apparatus information centrally. Alternatively, the processing component may be configured as a decentralized processing component, i.e., as a distributed computing environment, or may be configured as part of such a distributed computing environment. The distributed computer environment comprises, for example, a network of several decentralized data processing devices and/or a networked client-server system and/or a computer cloud (hereinafter also referred to as cloud for short) and/or a distributed ledger system and/or the like.

Furthermore, it is optionally provided that the apparatus information and the detection values are merged with each other in a common data structure, in particular according to the invention, in order to couple in particular the measurements with the associated specification. After detection and/or transmission, the detection values and the apparatus information can thus be merged for joint processing, in particular by a coupling component. This allows algorithms and/or analyses to be executed based on the data structure by a processing component. The results of this processing can be stored in the memory component via a coupling component and/or visualized, for example via a screen display, for a user. Further, analysis software may be used for processing and/or visualizing the results. For example, such detection values can be combined that were measured at apparatus components that are hydraulically related. Interfaces to measuring devices in the apparatus can be provided for the detection.

It may be possible for the apparatus information to include information that is used to combine the detection values in the data structure. For example, this information is information about which apparatus components are hydraulically connected.

The apparatus information can also include information to supplement missing detection values, for example, if no measurement was performed on some apparatus components. For this purpose, the apparatus information includes, for example, information on how the apparatus components interact with each other. The measurement includes, for example, a measurement of measured variables such as pressure or the like at the apparatus component.

The processing component can, for example, be configured as a computing component. The visualization can be used to support a user (and/or the operator of the apparatus) in clearly displaying and evaluating the interaction of the apparatus components such as pumps, in particular centrifugal pumps, and control valves. The visualization can be based on the apparatus information in order to consider a structure of the apparatus during the visualization. In this way, optimization potentials with regard to energy consumption and component loads as well as control performance can also be shown.

Furthermore, it can be provided that an automation of the apparatus is provided by the processing. For this purpose, the processing can, for example, trigger predefined measures at the apparatus, in particular when certain detection values and/or operating points correspond to a predefined trigger criterion, e.g. exceed a threshold value.

Further, within the scope of the invention, it may be provided that the apparatus information comprises at least one of the following static information about the apparatus:

- An information about a structure and/or a technical configuration of the apparatus,
- An information about a structure and/or a technical configuration of the apparatus components, in particular about an interaction of the apparatus components and/or about a hydraulic connection of the apparatus components,
- An information about a structural arrangement of the apparatus components in relation to each other in the apparatus, in particular in a pipe string and/or with an indication of an installation height,
- An information about the positions of the measuring points for the individual measurements in the apparatus.
- An information about the medium, e.g. density and/or viscosity, also referred to as medium data.

Furthermore, it may be provided that the apparatus information is initially provided to the processing component prior to performing the transmission of the detected detection values in order to evaluate the detection values transmitted during the transmission and/or during further transmissions based on the apparatus information initially provided. In other words, since the apparatus information is static information, it may be initially provided once rather than during each transmission.

Optionally, it may be provided that the following further step/stage is performed:

- Performing processing of the transmitted detection values based on the provided apparatus information by the processing component, preferably wherein the processing comprises analysis of the detection values in the context of the specification.

Furthermore, it is possible that as a result of the processing for at least one of the apparatus components at least one target variable is determined by a soft sensor system, in particular a soft sensor, and/or at least one parameter and/or at least one operating point. For example, analysis software can be used to evaluate the detection values of various apparatus components in context. For this purpose, operating and diagnostic data can be determined on the basis of the detection values.

Advantageously, it may be provided in the context of the invention that the at least one target variable and/or the at least one parameter is at least one of the following:

- A rotational speed and/or a flow rate and/or an inlet pressure and/or a delivery head and/or a power and/or a medium temperature and/or a result of a vibration analysis of the apparatus component in the form of a pump,
- A stroke position and/or a flow velocity and/or a differential pressure ratio and/or an inlet and outlet pressure and/or a medium temperature and/or a device status of the apparatus component in the form of a valve.

Accordingly, more generally formulated, the target variable and/or the parameter can be a target variable or parameter of a pump and/or a valve. Thus, an extensive characterization of the apparatus and conclusion for possible optimizations can be possible.

Furthermore, it is advantageously provided in a method according to the invention that the at least one operating point is calculated on the basis of the at least one target variable and/or on the basis of the at least one parameter. This can further improve the characterization of the apparatus.

It is also conceivable that an evaluation of the apparatus and in particular of the at least one apparatus component is carried out on the basis of the result of the processing and in particular on the basis of the operating point, and preferably a result of the evaluation is visualized for a user by a color and/or symbol coding, in particular a traffic light function. The traffic light function generates, for example, an output in different, in particular three different, colors depending on the classification of the result into at least or exactly three categories. Further, e.g., depending on the apparatus structure provided by the apparatus information as well as the available detection values, at least one algorithm can be parameterized in the processing component in order to model missing measuring points as soft sensor systems and/or to determine all operating points of the hydraulically active apparatus components (in particular of at least one pump as well as at least one control valve). The calculated operating points can then be evaluated by means of the at least one algorithm. During visualization, the evaluation results can be output as status messages for each apparatus component. A color coding can be used here, e.g. the following:

Gray=Diagnosis off
Green=No abnormalities
Light green=near specification limit
Yellow=Out of specification
Blue=Maintenance required
Orange=function control
Red=Failure The color coding may further be based on a NAMUR NE107 color coding and/or be implemented as a modified NAMUR NE107 color coding. The modification may include, for example, the addition of a further intermediate level, i.e. a further subdivision, in particular to visualize a condition of an apparatus component close to a specification limit.

The respective evaluation or the result of the evaluation can also be described in more detail in a message text during visualization and/or possible causes and/or suitable remedial options and/or recommendations for action can be shown.

It is further conceivable that the visualization of the result of the evaluation comprises a graphical output for the respective apparatus component, and in particular the color and/or symbol coding and/or the message text, on at least one photographic image and/or live image of the apparatus. The output is, for example, a visual display of the message text and/or the symbol of the symbol coding and/or the color of the color coding. Further, it may be possible for each output to be positioned based on a position of the apparatus component in the image. The position can be predefined and, for example, be indelibly linked to the image in a data structure, preferably in the apparatus information. Furthermore, the output can take place, for example, in a screen display and/or in VR glasses (VR stands here for "virtual reality") and/or the like.

It may be further advantageous through processing that based on the complete component evaluations, in particular the assessment of operational data compared to configuration data, the overall hydraulic system may also be further analyzed. The analysis can be performed with regard to, among other things:

a) Identification of cross-system and cross-operating data causalities, e.g. correlations between the apparatus components and/or their operating points, and thus the respective load,
b) Energy saving potentials based on the electric and hydraulic powers introduced into the hydraulic system of the apparatus and the hydraulic powers dissipated in the passive elements,
c) A control value reserve, this is the bandwidth in which the operating points can still be adjusted in the direction of a better or optimized operating point, whereby the control variables for this can be the rotational speed of the pump(s) and the stroke position(s) of the control valve(s),
d) A configuration of the apparatus components and/or size/type and mode of operation of the apparatus components,
e) An optimization of control circuits of the apparatus,
f) A referencing and plausibility check of operating and diagnostic data.

In this way, optimization potentials across systems can be made transparent with regard to load reduction and energy savings and control performance.

It may optionally be possible for the steps/stages of the method to be carried out repeatedly, whereby in each case the result of the processing and in particular a status determined therefrom and/or a result of an evaluation of the at least one apparatus component is visualized for a user and/or the results of the processing operations are permanently stored centrally. In this way, the apparatus can be continuously monitored and optimized.

Furthermore, the visualization can be carried out in the form of a cross-component visualization. For this purpose, for example, the detection values can be displayed together with the addition of the determined values of different apparatus components. An individual and/or cross-component evaluation of the apparatus components can also be carried out.

The evaluation is carried out, for example, by analysis using processing. For example, apparatus components such as pumps (i.e. one or more pumps) and control valves (i.e. one or more control valves) can be evaluated with regard to their interaction. The basis for the evaluation can be the detection (in particular a readout) of the detection values in the form of operating and diagnostic data from the apparatus. The detected detection values can be stored in a memory component, for example, and transmitted (forwarded) to a processing component for analysis in the next step/stage.

It may be provided within the scope of the invention that during processing an analysis is performed which comprises a calculation and/or estimation of detection values for further, exclusively virtually provided, measuring points of the apparatus. In the case of virtual measuring points, no real measured values of a measurement at this measuring point are available, and the measured value is therefore derived from the available detection values and from the apparatus information. By processing, for example, at least one soft sensor can be provided, which calculates at least one measured value for at least one measuring point of the apparatus, at which no real measurement is provided or available, and thus no detection values are obtained by a real measurement.

In a further possibility, it can be provided that a simulation of the apparatus is carried out on the basis of the result of the processing, wherein at least one change of at least one parameter and/or at least one operating point entered by a user is simulated. Thus, it is possible for a user to reliably simulate different situations of the apparatus on the basis of the result of the processing.

It is provided in the method according to the invention the further following step/stage:

Performing a or the processing of the transmitted detection values by the processing component.

Preferably, the transmitted detection values can be processed with each other, in particular compared, on the basis of the apparatus information. The processing can be performed to identify and/or distinguish at least one open circuit from at least one closed circuit of the apparatus. In this context, it may be possible that the apparatus is modeled in the form of a hydraulic apparatus based on the specification and the measurements. This enables a distinction of the at least one open circuit and the at least one closed circuit to be made as a result of the processing. For modeling purposes, the processing may decompose the apparatus into modules, and for each module the aforementioned distinction may take place. For example, the processing can be performed by selecting an apparatus and calculation key in the processing component depending on the apparatus information (and thus in particular the analog structure) as well as the detection information (e.g. one key is provided for an open hydraulic circuit and further keys are provided for closed hydraulic circuits in different versions). Depending on the condition, some parameters (e.g. measured variables such as pressure) of the apparatus components may be known and others may not. Missing parameters can be modeled and calculated based on the known detection values, for example, by at least one soft sensor. In other words, missing measuring points can be modeled as soft sensor systems and the and in particular all operating points of the (hydraulically active) apparatus components (i.e. in particular of at least one pump as well as at least one control valve) can be determined.

Furthermore, within the scope of the invention, it is advantageous if, during processing the detection values are at least partially compared with at least one threshold value in order to determine an operating state of the at least one apparatus component and/or to perform an evaluation of the at least one apparatus component. The threshold values can thereby form limit values and/or limit ranges. If, for example, the detection values are vibration and/or temperature measurement values, the threshold values can indicate the range in which these detection values are permissible for the specific apparatus component. The threshold values can, for example, be determined on the basis of the apparatus information and/or defined thereby. If necessary, the apparatus information can be used to recognize operation of the apparatus components outside the specification.

It can be advantageous if, within the scope of the invention, a time stamp is assigned to each of the detection values during detection and/or transmission. This makes it possible to allocate the various detection values in time, which may be necessary for processing. Delays can occur due to the collection of the detection values from different measuring points, which can be countered in this way.

Furthermore, it is conceivable that the transmission comprises a data transmission, preferably via a communication component, preferably using a communication protocol. It is further conceivable that the transmission comprises a wireless data transmission and/or a transmission via the Internet and/or a transmission via a mobile network. Alternatively or additionally, the transmission may be via a network, such as a WLAN (Wireless Local Area Network) and/or Ethernet. Further, the transmission may also be to a cloud in which the processing component is provided to perform the processing in a cloud-based manner.

It is also optionally conceivable for the processing component to additionally perform the following steps/stages:

Providing further apparatus information on specifications of further apparatuses and/or further measurements at different measuring points and apparatus components of the further apparatuses, Receiving detection values of the further apparatuses, whereby the detection values are specific for the measurements at the different measuring points and apparatus components of the further apparatuses.

Thus, it is possible to centrally collect and evaluate the detection values for different spatially separated apparatuses, whereby the central location may not be spatially fixed.

Also an object of the invention is a system for providing at least one piece of information about a hydraulic apparatus, comprising:

A field component, in particular in the form of a data processing device, for an detection of detection values at the apparatus, preferably the detection values being specific for measurements at different measuring points and/or at different apparatus components of the apparatus, and (the field component) for a transmission of the detected detection values to a processing component, A configuration component, for example in the form of a data processing device with an input means/elements for a user, for providing an apparatus information about a specification of the apparatus and/or the measurements at the processing component.

Thus, the system according to the invention brings the same advantages as have been described in detail with reference to a process according to the invention. In addition, the system may be suitable to be operated by a method according to the invention.

It may be advantageous if, within the scope of the invention, the at least one apparatus component is configured in each case as a hydraulic component. In a further possibility, it may be provided that the apparatus components comprise at least one pump, in particular centrifugal pump, and/or a control valve. In other words, the apparatus components may each be configured as a pump, in particular a centrifugal pump, or a valve.

Another object of the invention is a computer-implemented data structure, in particular a non-volatile data structure, comprising a plurality of detection values and apparatus information. Here, it is provided that the apparatus information is implemented as information about a specification of a hydraulic apparatus with different apparatus components and/or about a specification of measurements at the apparatus components, wherein the detection values are specific for measurements at measuring points at the apparatus components. Thus, the computer-implemented data structure according to the invention provides the same advantages as have been described in detail with reference to a method according to the invention. Furthermore, it may be provided that the data structure according to the invention is used in a method according to the invention, in particular for providing the transmitted detection values with the apparatus information at the processing component. The data structure may, for example, be stored digitally in a non-volatile manner in a memory component of the processing component.

The use of the data structure has the advantage that after detection and/or transmission, the detection values and the apparatus information can be combined for joint processing, in particular by a coupling component. This makes it possible for algorithms and/or analyses to be executed on the basis of the data structure by processing the processing component.

The results of this processing can be stored in the memory component via a coupling component and/or visualized, e.g. via a screen, for a user. Furthermore, the data structure and/or the processing based thereon can control and/or influence an automation of the apparatus.

Also an object of the invention is a computer program, in particular a non-volatile computer program product, comprising instructions which, when the computer program is executed by a processing component, cause the processing component to perform the subsequent steps/stages:

Providing at least one apparatus information about a specification of a hydraulic apparatus and/or measurements at different measuring points and/or at different apparatus components of the apparatus, Receiving detection values of the apparatus, where the detection values are specific to the measurements.

Thus, the computer program according to the invention provides the same advantages as have been described in detail with reference to a method according to the invention. It may be provided in the context of the invention that, when the computer program is executed by the processing component, the instructions cause the processing component to execute, at least in part, a method according to the invention. In particular, those steps/stages may be executed thereby which are executed according to the method by the processing component.

Figure 2:
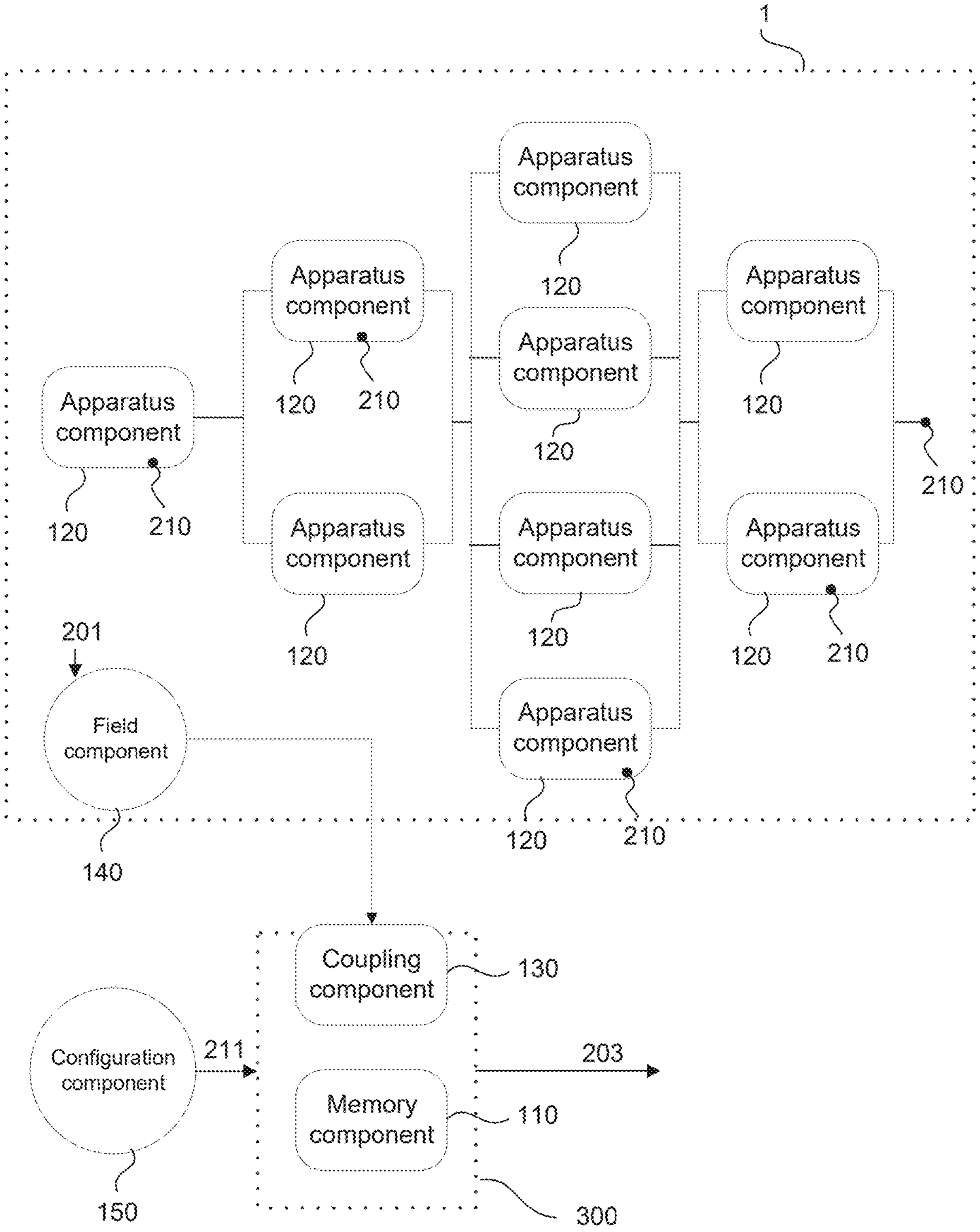

Further advantages, features and details of the invention will be apparent from the following description, in which embodiments of the invention are described in detail with reference to the drawings. In this connection, the features mentioned in the claims and in the description may each be essential to the invention individually or in any combination. They are each shown schematically:

FIG. 1 a representation of method steps/stages of a process according to the invention, FIG. 2 a system according to the invention.

In the following figures, the identical reference signs are used for the same technical features even of different embodiments.

FIG. 1 schematically visualizes a method according to the invention for providing at least one piece of information about a hydraulic apparatus 1.

In accordance with a first method step/stage 221, a detection 201 of detection values 210 is performed at the apparatus 1, the detection values 210 being specific for measurements at different measuring points and at different apparatus components 120 of the apparatus 1. According to a second method step/stage 222, a transmission 202 of the detected detection values 210 to a processing component 300 is performed. Furthermore, according to a third method step/stage 223, it is provided that an apparatus information 211 about a specification of the apparatus 1 and/or the measurements and/or virtual measuring points (soft sensors) is provided at the processing component 300 in order to provide the transmitted detection values 210 together with the apparatus information 211.

FIG. 2 schematically shows a system according to the invention, which, like the method according to the invention, is used to provide at least one piece of information about a hydraulic apparatus 1. At least one field component 140 may be provided for detecting 201 the detection values 210 at the apparatus 1. This may also be understood as collecting the detection values 210. The detection values 210 may have been previously measured as measured values at different measuring points in each case, or may have been determined by processing measured values as pre-processed values, in particular diagnostic values. Further, the field component 140 may serve to perform a transmission 202 of the detected detection values 210 to a processing component 300. A configuration component 150 may further provide apparatus information 211 about a specification of the apparatus 1 and/or the measurements at the processing component 300. This may be done, for example, initially to configure the system according to the invention so that the apparatus information 211 is available for subsequent transmissions of detection values 210 for processing. Furthermore, a coupling component 130 may be provided to combine the apparatus information 211 and the detection values 210 into a common data structure, in particular according to the invention, and/or to store it in a non-volatile manner in a memory component 110 of the processing component 300.

The processing component 300 can execute a computer program, in particular according to the invention, for processing. It is possible that at least one parameter and/or at least one operating point of the respective apparatus component 120 is determined and/or evaluated by the processing 203 on the basis of the transmitted detection values 210 and in particular on the basis of the apparatus information 211. It is further possible that the detection values 210 and/or the operating points are evaluated in this case by means of algorithms. For example, in the case of an apparatus component 120 in the form of a pump, the parameter rotational speed and/or flow rate and/or inlet pressure (NPSH) and/or delivery head and/or power and/or medium temperature and/or vibration analysis can be determined and/or evaluated. Furthermore, for an apparatus component 120 in the form of a valve, the parameter stroke position and/or flow velocity and/or differential pressure ratio and/or inlet and outlet pressure and/or medium temperature and/or device status can be determined and/or evaluated. A result of this evaluation can be, for example, a status of the apparatus component.

For each apparatus component, the evaluation results of the aforementioned evaluation can be output as status messages during visualization, if necessary. For example, different displays can be provided in the visualization for the status “diagnosis off”, “no abnormalities”, “near specification limit”, “out of specification”, “maintenance required”, “function check” and “failure”. The respective evaluation can also be described in more detail in a message text, and/or possible causes and suitable remedial options or recommendations for action can also be shown.

Based on the evaluations, the apparatus 1 as a whole can also be further analyzed as an overall hydraulic system. For example, the analysis of the processing component 300 can be used to determine relationships between the apparatus components 120 or their operating points, and thus the respective load, and/or to determine potential energy savings based on the electrical and hydraulic powers introduced into the system and the hydraulic powers dissipated in the passive elements. Alternatively or additionally, the analysis can be performed with regard to the actuating value reserve. The actuating value reserve is the bandwidth in which the component operating points can still be adjusted in the direction of a better or optimized operating point. The manipulated variables for this can be the rotational speed of the pump(s) and the stroke position(s) of the control valve (s). Another possibility is to carry out the analysis with regard to the component configuration or size/type and mode of operation, and/or to optimize control circuits of the apparatus 1 and/or to carry out a referencing and plausibility check of operating and diagnostic data. In this way, optimization potentials can be made transparent across the system with regard to load reduction, energy savings and/or control performance.

The apparatus 1 shown in FIG. 2 can be configured as an open hydraulic circuit. By way of example, the apparatus 1 may comprise as apparatus component 120 a rotational speed-controlled centrifugal pump 120 and several, e.g. eight, downstream control valves 120 of different sizes. The structure shown in FIG. 2 is purely exemplary and serves only to represent further possible structures. The specific structure is indicated as static information by the apparatus information 211.

The centrifugal pump 120 is connected upstream of the parallel-connected control valves 120 as a hydraulically active apparatus component 120. It may be a problem in monitoring the apparatus 1 that detection values 210 for the apparatus components 120 are only incompletely available. For example, in order to determine the operating points of the aforementioned apparatus components 120, it may be necessary to determine the inlet and outlet pressures, the associated flow, and the medium temperature in each case, whereby the detection values 120 for these variables are not available from measurements on the apparatus components 120. These unknown quantities can therefore be determined, even without being directly measured, in the processing component 300. In this way, it is possible to nevertheless determine the operating points. In this context, it is also possible to speak of the use of a soft sensor system.

For the determination of the unknown variables, and the calculation of the corresponding unavailable detection values 210, it may be provided that other available detection values 210 of the hydraulic apparatus 1, in particular of other apparatus components 120, are used.

These detection values 210 may, for example, result from a pressure measurement and/or a flow measurement and/or a temperature measurement and/or a determination of a pump rotational speed and/or a determination of a valve position. For the calculation, these detection values 210 can then be processed with the apparatus information 211 to calculate the unavailable detection values 210 as virtual values. Such calculated values are also referred to as "soft sensor system" values. In the method according to the invention, the calculation of the virtual values may be performed entirely within the processing 203. The calculated values can subsequently be stored, brought to display and/or fed to an evaluation logic. Thus, the operational data of the apparatus components 120 is completed, and can now be compared to the associated configuration data of the individual apparatus components 120. This comparison may be performed as part of the evaluation logic, and may be correspondingly linked to an evaluation system. The results of the evaluation can also be stored and displayed in parallel to the user, for example as a color-coded display traffic light, i.e. by a traffic light function.

The foregoing description of the embodiments describes the present invention exclusively in the context of examples. Of course, individual features of the embodiments may be freely combined with one another, provided that this is technically expedient, without departing from the scope of the present invention.

LIST OF REFERENCE SIGNS

1 Apparatus
110 Memory component
120 Apparatus components
130 Coupling component
140 Field component
150 Configuration component
201 Detection
202 Transmission
203 Processing
210 Detection values
211 Apparatus Information
300 Processing component
221-223 Method steps/stages

The invention claimed is:

1. A method for providing at least one piece of information about a hydraulic apparatus, wherein the following stages are performed:

performing a detection of detection values at the apparatus, wherein the detection values are specific for measurements at different measuring points and at different apparatus components of the apparatus, performing a transmission of the detected detection values to a processing component, providing apparatus information about at least a specification of the apparatus or the measurements, wherein providing of the apparatus information is performed at the processing component to provide the transmitted detection values with the apparatus information and wherein the apparatus information is static information about the apparatus, performing processing of the transmitted detection values based on the provided apparatus information by the processing component, wherein as a result of the processing for at least one of the apparatus components at least one target variable is determined by at least a soft sensor system and at least one operating point, wherein the at least one target variable is at least one of a first variable or a second variable:

where the first variable for a pump is a rotational speed, a flow rate, an inlet pressure, a delivery head, a power, a medium temperature at the pump, or a result of a vibration analysis of the pump, where the second variable for a valve is a stroke position, a flow velocity, a differential pressure ratio, an inlet and outlet pressure, a medium temperature at the valve, or a device status of the valve, wherein the at least one operating point is calculated at least on the basis of the at least one target variable or on the basis of the at least one parameter, and wherein an evaluation of the at least one apparatus component is carried out on the basis of the result of the processing, and wherein the at least one target variable is a virtual value at the at least one operating point where no real measured values of the at least one target variable are available.

2. The method according to claim 1, further comprising a subsequent stage of:

performing processing of the transmitted detection values by the processing component, the transmitted detection values being compared with one another on the basis of the apparatus information in order to provide a soft sensor system at least for at least one further virtual measuring point of the apparatus or for at least one further apparatus component of the apparatus or for at least one further target variable in the apparatus.

3. The method according to claim 1, wherein the detection values are thereby specific to the measurements, in that the detection values are at least partially detected in the form of measured values by the measurements at least at the different measuring points or the different apparatus components of the apparatus, and in that the detection values are detected at least partially in the form of pre-processed values, at least by processing at least one of the measured values or by processing further measured values, at at least one of the apparatus components of the apparatus.

4. The method according to claim 1, wherein the processing component is configured as a central processing component for centrally providing the transmitted detection values with the apparatus information.

5. The method according to claim 1, wherein the apparatus information and the detection values are merged with each other in a common data structure to couple the measurements with the associated specification.

6. The method according to claim 1, wherein the apparatus information comprises at least one of the following static information about the apparatus:

information about at least a structure or a technical configuration of the apparatus, information about at least a structure or a technical configuration of the apparatus components, information about a structural arrangement of the apparatus components with respect to each other in the apparatus, an information about the positions of the measuring points for the individual measurements in the apparatus, wherein the apparatus information is initially provided to the processing component prior to performing the transmission of the detected detection values, in order to evaluate the detection values transmitted at least during the transmission or during further transmissions based on the initially provided apparatus information.

7. The method of claim 1, wherein the visualization of the result of the evaluation comprises a graphical output for the respective apparatus component, at least on at least one photographic image or live image of the apparatus, the output being positioned in each case on the basis of a position of the apparatus component in the image.

8. The method according to claim 1, wherein the stages of the method are carried out repeatedly, in each case at least the result of the processing or a result of an evaluation of the at least one apparatus component being visualized for a user or the results of the processing being permanently stored centrally.

9. The method according to claim 1, wherein an analysis is carried out during the processing which comprises at least a calculation or estimation of detection values for further, exclusively virtually provided, measuring points of the apparatus.

10. The method according to claim 1, wherein a simulation of the apparatus is carried out on the basis of the result of the processing, at least one change, entered by a user, at least of at least one parameter or at least one operating point being simulated.

11. The method according to claim 1, wherein during the processing, the detection values are at least partially compared with at least one threshold value in order to at least determine an operating state of the at least one apparatus component or to perform an evaluation of the at least one apparatus component.

12. The method according to claim 1, wherein at least during the detection or during the transmission, the detection values are each assigned a time stamp.

13. The method according to claim 1, wherein the transmission comprises at least a wireless data transmission or a transmission via the Internet or a transmission via a mobile network.

14. The method according to claim 1, wherein in the case of the processing component, the following stages are additionally carried out:

providing at least further apparatus information on specifications of further apparatuses or further measurements at different measuring points and apparatus components of the further apparatuses, receiving detection values of the further apparatuses, wherein the detection values are specific for the measurements at the different measuring points and apparatus components of the further apparatuses.

15. The method according to claim 1, further comprising a subsequent stage of:

performing processing of the transmitted detection values by the processing component, wherein the transmitted detection values are processed together based on the apparatus information to identify at least one open hydraulic circuit from at least one closed hydraulic circuit of the apparatus, wherein the apparatus is modeled in the form of a hydraulic apparatus based on the specification and the measurements.

16. A system for providing at least one piece of information about a hydraulic apparatus, comprising:

a field component for a detection of detection values at the apparatus, wherein the detection values are specific for measurements at different measuring points and at different apparatus components of the apparatus, and for a transmission of the detected detection values to a processing component, a configuration component for providing at least apparatus information about a specification of the apparatus or the measurements at the processing component, wherein the processing component processes the transmitted detection values based on the provided apparatus information, wherein as a result of the processing for at least one of the apparatus components at least one target variable is determined by at least a soft sensor system and at least one operating point, and wherein the apparatus information is static information about the apparatus, wherein the at least one target variable is at least one of a first variable and a second variable:

where the first variable for a pump is a rotational speed, a flow rate, an inlet pressure, a delivery head, a power, a medium temperature at the pump, or a result of a vibration analysis of the pump, where the second variable for a valve is a stroke position, a flow velocity, a differential pressure ratio, an inlet and outlet pressure, a medium temperature at the valve, or a device status of the valve, wherein the at least one operating point is calculated at least on the basis of the at least one target variable or on the basis of the at least one parameter, and wherein an evaluation of the at least one apparatus component is carried out on the basis of the result of the processing, and wherein the at least one target variable is a virtual value at the at least one operating point where no real measured values of the at least one target variable are available.

17. The system according to claim 16, wherein the apparatus components are each configured as hydraulic components.

18. The system according to claim 16, wherein the apparatus components at least comprise at least one pump or comprise a control valve.

* * * * *